(12) United States Patent
Lin

(10) Patent No.: US 10,368,499 B1
(45) Date of Patent: Aug. 6, 2019

(54) COMBINATION-TYPE GLASS-GREENHOUSE

(71) Applicant: Yi-Ho Lin, Kaohsiung (TW)

(72) Inventor: Yi-Ho Lin, Kaohsiung (TW)

( * ) Notice: Subject to any disclaimer, the term of this patent is extended or adjusted under 35 U.S.C. 154(b) by 0 days.

(21) Appl. No.: 16/102,760

(22) Filed: Aug. 14, 2018

(51) Int. Cl.
| | | |
|---|---|---|
| *A01G 9/16* | (2006.01) | |
| *E04B 1/19* | (2006.01) | |
| *E04H 15/34* | (2006.01) | |
| *E04B 1/24* | (2006.01) | |

(52) U.S. Cl.
CPC .............. *A01G 9/16* (2013.01); *E04B 1/1903* (2013.01); *E04B 1/2403* (2013.01); *E04H 15/34* (2013.01); *E04B 2001/1936* (2013.01); *E04B 2001/2406* (2013.01)

(58) Field of Classification Search
CPC ....... A01G 9/16; E04B 1/1903; E04B 1/2403; E04B 2001/1936; E04B 2001/2406; E04H 15/34
See application file for complete search history.

(56) References Cited

U.S. PATENT DOCUMENTS

| | | | | |
|---|---|---|---|---|
| 3,424,178 A * | 1/1969 | Yazaki | ...................... | A01G 9/16 135/157 |
| 4,066,089 A * | 1/1978 | Rainwater | ............... | E04H 15/48 135/114 |
| 4,084,598 A * | 4/1978 | Rainwater | ............... | E04H 15/44 135/115 |
| 4,167,838 A * | 9/1979 | Metheny | ................... | A01G 9/14 52/79.5 |
| 4,505,609 A * | 3/1985 | Vella | ....................... | E04H 15/18 403/170 |
| 4,516,376 A * | 5/1985 | King | ................... | A47B 47/0008 403/171 |
| 4,723,384 A * | 2/1988 | Mengeringhausen | .... | E04B 1/24 52/126.1 |
| 4,864,795 A * | 9/1989 | Burg | ........................ | F16B 7/04 52/646 |
| 5,421,666 A * | 6/1995 | Spears | .................. | B29C 65/561 403/169 |
| 5,549,408 A * | 8/1996 | Lo | ....................... | A47B 47/0016 403/171 |
| 5,555,681 A * | 9/1996 | Cawthon | ................... | A01G 9/16 52/63 |
| 5,580,181 A * | 12/1996 | Nomura | ............. | A47B 47/0016 403/170 |
| 5,640,811 A * | 6/1997 | Boyle | ..................... | E04H 4/108 135/142 |
| 5,651,630 A * | 7/1997 | Nomura | ................ | E04B 1/5806 403/170 |
| 5,660,002 A * | 8/1997 | Lashinger | ................ | A01G 9/16 52/63 |
| 5,690,446 A * | 11/1997 | Poissant | ................. | A63H 33/10 403/361 |

(Continued)

*Primary Examiner* — James M Ference
(74) *Attorney, Agent, or Firm* — Leong C. Lei

(57) ABSTRACT

The present invention is a combination-type glass-greenhouse which comprises a plurality of base connectors, first connectors, second connectors, third connectors, fourth connectors, fifth connectors, combination-connection tubes, glass plates, pressing-tugging plates, and connection components; which can combine and set to form a glass-greenhouse according to the needs of users. And, it is a combination-type glass-greenhouse with simple structure, quick assembly and disassembly.

1 Claim, 10 Drawing Sheets

(56) References Cited

U.S. PATENT DOCUMENTS

| | | | | |
|---|---|---|---|---|
| 5,700,102 A * | 12/1997 | Feleppa | ............ | A47B 47/0016 403/170 |
| 5,813,169 A * | 9/1998 | Engerman | ................ | A01G 9/16 47/17 |
| 5,927,363 A * | 7/1999 | Olsen | ...................... | E04F 10/02 135/116 |
| 6,338,226 B1 * | 1/2002 | Gauthier | ................ | A01G 9/14 52/63 |
| 6,618,988 B2 * | 9/2003 | Williams | ................ | A01G 9/16 47/17 |
| 6,854,238 B2 * | 2/2005 | Boots | ................... | A47B 47/027 403/176 |
| 7,814,727 B2 * | 10/2010 | LaCasse | ................. | E04B 1/0046 52/222 |
| 8,505,246 B1 * | 8/2013 | Cadorath | ................ | E04B 7/163 52/79.6 |
| 9,212,503 B1 * | 12/2015 | Mentch | ................... | A01G 9/22 |
| 2004/0111983 A1 * | 6/2004 | Rozenberg | ............... | A01G 9/16 52/79.1 |
| 2004/0206013 A1 * | 10/2004 | Berg | ........................ | A01G 9/16 52/63 |
| 2005/0036829 A1 * | 2/2005 | Trull | ........................ | A01G 9/16 403/170 |
| 2008/0222991 A1 * | 9/2008 | Wood | .................... | E04B 1/0046 52/656.1 |
| 2009/0007500 A1 * | 1/2009 | Boots | .................... | A47B 47/021 52/81.3 |
| 2009/0126310 A1 * | 5/2009 | Liang | ...................... | A01G 9/16 52/653.2 |
| 2009/0239441 A1 * | 9/2009 | Hu | .......................... | A63H 33/10 446/123 |
| 2011/0078950 A1 * | 4/2011 | Rasmussen | ............... | A01G 9/16 47/20.1 |
| 2013/0276382 A1 * | 10/2013 | Workman | ............... | E04H 15/44 52/63 |
| 2017/0245442 A1 * | 8/2017 | Stewart | .................... | A01G 9/16 |

* cited by examiner

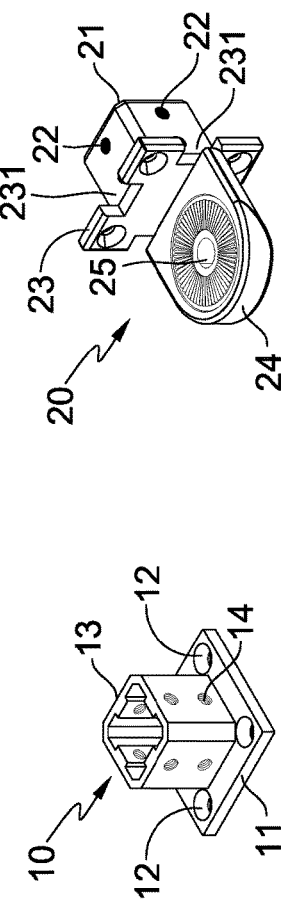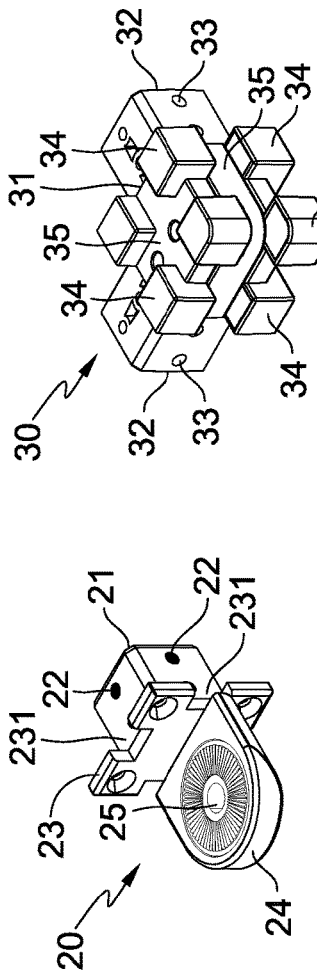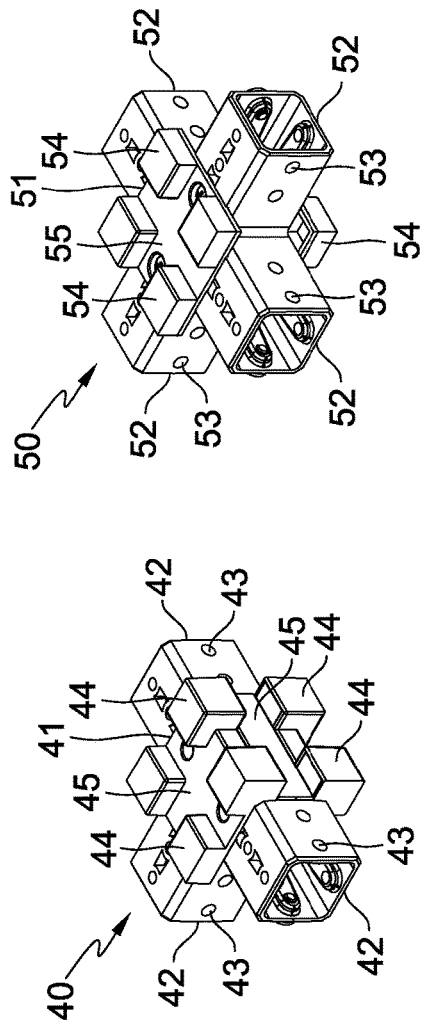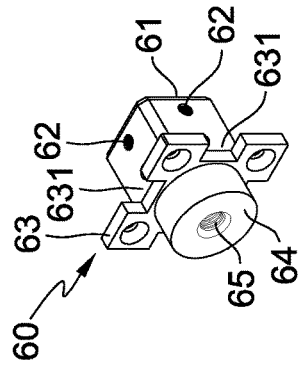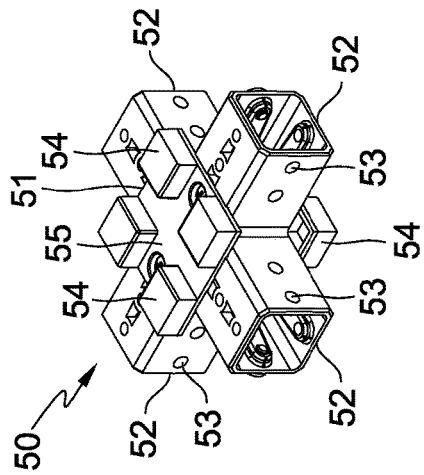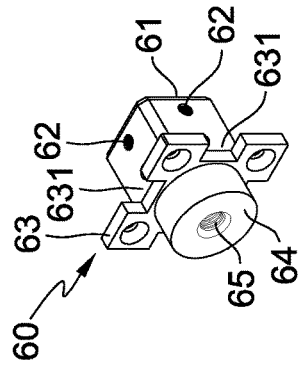

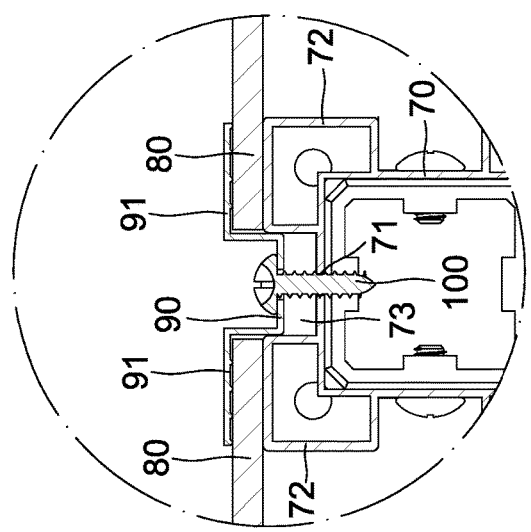
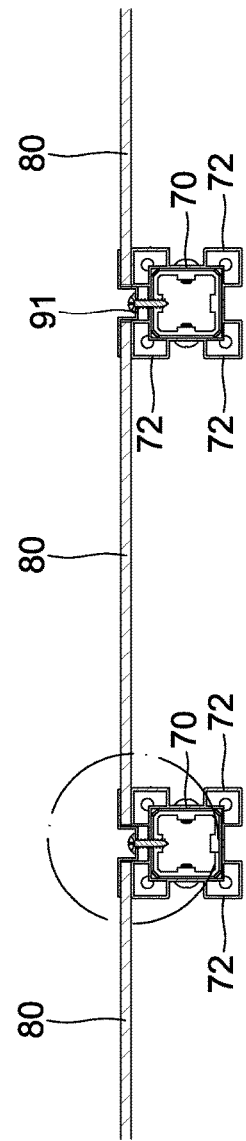
FIG. 9B
FIG. 9A

COMBINATION-TYPE GLASS-GREENHOUSE

(a) TECHNICAL FIELD OF THE INVENTION

The present invention relates to a combination-type glass-greenhouse, and especially relates to a glass-greenhouse with simple structure, quick assembly and disassembly.

(b) DESCRIPTION OF THE PRIOR ART

Due to the booming industry and the increase in the number of human beings, the area of farming is reduced. At the same time, due to changes in the climate environment, the growth of plants is affected or damaged by heavy rains and windstorms and the supply of vegetables, fruits and foods is insufficient. Therefore, how to maintain the growth environment of plants and enhance the harvest of plants are the subjects of current agricultural development.

In order to solve the above problems, at present, a greenhouse (or glass-greenhouse, warm house) is developed, which is a building constructed of glass or plastic and is heated by the electromagnetic radiation emitted by the sun to make the plants, soil, air, . . . etc. in the greenhouse get warming.

Therefore, it is possible to grow crops earlier and it is not susceptible to the weather, and it also has the effect of preventing the excessive evaporation of water in dry areas. Such that, the greenhouses can protect the crops from overheating or excessive cold. And, the greenhouses can protect the plants from the threats of fallen hail, sandstorm, heavy rain or blizzard, and pest infestation.

In addition, some non-cultivated land can be turned into arable land through the control of light and temperature in the greenhouse, so it can be used to grow vegetables and fruits and increase the yield of vegetables and fruits.

Most of the above-mentioned greenhouse building are formed by combining a plurality of steel materials and metal pipe fittings to form a main body skeleton, and then covering the fixed glass to form a glass-greenhouse.

However, since the glass-greenhouse is formed by welding to combine the main skeleton, it is not only complicated to assemble, but also expensive to manufacture. And, when the skeleton of the main body is damaged, it is necessary to disassemble and destroy some part of the skeleton to proceed the maintenance and replacement. Therefore, there truly exists a lack of inconvenience in maintenance. Furthermore, once the glass-greenhouse is completed, it cannot be disassembled and moved to other places as required, and the size of the area covered by the greenhouse cannot be changed. Therefore, there exists a lack of inconvenience in use and movement.

SUMMARY OF THE INVENTION

The object of the present invention is to improve the above-mentioned defects, and to provide a glass-greenhouse which has a simple structure, can be quickly assembled, and can adjust multi-angle and multi-directionality. In order to achieve the above objects, the combination-type glass-greenhouse of the present invention comprises a plurality of base connectors, first connectors, second connectors, third connectors, fourth connectors, fifth connectors, combination-connection tubes, glass plates, pressing-tugging plates, and connection components.

The base connector has a fixing bottom-plate, and a plurality of positioning lockholes are set in the fixing bottom-plate; wherein a plugging connector is protrudedly set from the fixing bottom-plate. The plugging connector is provided for the plug-in placement of the combination-connection tube; wherein a plurality of lockholes are set on the sidewalls of the plugging connector.

The first connector has a plugging connector at one end thereof, and the plugging connector is provided for the plug-in placement of the combination-connection tube. The sidewalls of the plugging connector are set with a plurality of lockholes, and a rear end of the plugging connector is set with a square stopping-blocking plate, and each side edge of the square stopping-blocking plate is set with a notch. The other end of the square stopping-blocking plate is set with a sleeve-connection seat which is generally semi-cylindrical; wherein a lockhole is radially set on the sleeve-connection seat.

The second connector has a square stopping-blocking seat, and two plugging connectors are set on each side of the square stopping-blocking seat to make the second connectors be substantially L-shaped. The plugging connector is provided for the plug-in placement of the combination-connection tube; and the sidewalls of the two plugging connectors are set with a plurality of lockholes. A plurality of pad blocks are protrudedly set from the periphery of the square stopping-blocking seat, and a concave groove is set in the center of the pad blocks.

The third connector has a square stopping-blocking seat, and three plugging connectors are set on adjacent three sides of the square stopping-blocking seat to make the third connectors be substantially T-shaped. The plugging connector is provided for the plug-in placement of the combination-connection tube; and the sidewalls of the three plugging connectors are set with a plurality of lockholes. A plurality of pad blocks are protrudedly set from the periphery of the square stopping-blocking seat, and a concave groove is set in the center of the pad blocks.

The fourth connector has a square stopping-blocking seat, and four plugging connectors are set on four sides of the square stopping-blocking seat to make the fourth connectors 50 be substantially cross-shaped. The plugging connector is provided for the plug-in placement of the combination-connection tube; and the sidewalls of the four plugging connectors are set with a plurality of lockholes. A plurality of pad blocks are protrudedly set from the periphery of the square stopping-blocking sea, and a concave groove is set in the center of the pad blocks.

The fifth connector which one end thereof forms a plugging connector and the plugging connector is provided for the plug-in placement of the combination-connection tube; wherein the sidewalls of the plugging connector are set with a plurality of lockholes. The rear end of the plugging connector is set with a square stopping-blocking plate, and the other end of the square stopping-blocking plate is protrudedly set with a positioning seat. The positioning seat is axially set with a positioning lockhole. And, each side edge of the square stopping-blocking plate is set with a concave groove opening.

The combination-connection tube is a tubular-body which is substantially rectangular-shape and has a plurality of locking-matching holes on the wall. The combination-connection tubes can be plugged-in to connect with the base connectors, first connectors, second connectors, third connectors, fourth connectors, and the plugging connectors of the fifth connectors. The periphery of the combination-connection tube is set with a plurality of pad blocks, and a concave groove is set between the two pad blocks.

The glass plates are placed on the pad blocks of the combination-connection tubes and on the first connectors, second connectors, third connectors, the fourth connectors, and the fifth connectors.

The pressing-tugging plate is a plate-body which is substantially U-shape, and is set with wing-portion on both sides thereof. The pressing-tugging plates are set with a plurality of locking-matching holes. The pressing-tugging plates can be placed on the concave grooves of the combination-connection tubes and in the notches of the first connectors and fifth connectors, and placed in the concave grooves of the second connectors, third connectors, and fourth connectors. The wing-portion of the pressing-tugging plates is pressed and tugged on the glass plates.

The connection components can be inserted and set into the lockholes of the combination-connection tubes and the locking-matching holes of the pressing-tugging plates; and lock to the lockholes of the base connectors, first connectors, second connectors, third connectors, fourth connectors, and fifth connectors to position and fix the combination-connection tubes and the pressing-tugging plates.

Thereby, a glass-greenhouse which is simple in structure, quick to assemble, and can adjust multi-angle and multi-directionality is provided.

BRIEF DESCRIPTION OF THE DRAWINGS

FIG. 1A is a perspective view of the base connector according to the present invention.

FIG. 1B is a perspective view of the first connector according to the present invention.

FIG. 1C is a perspective view of the second connector according to the present invention.

FIG. 1D is a perspective view of the third connector according to the present invention.

FIG. 1E is a perspective view of the fourth connector according to the present invention.

FIG. 1F is a perspective view of the fifth connector according to the present invention.

FIG. 9A is a sectional-view schematic diagram for combining and setting the glass plates and the pressing-tugging plates on the lattice-type roof according to the present invention.

FIG. 9B is an enlarged view of a portion of FIG. 9A.

DETAILED DESCRIPTION OF THE PREFERRED EMBODIMENTS

Figure 2B:
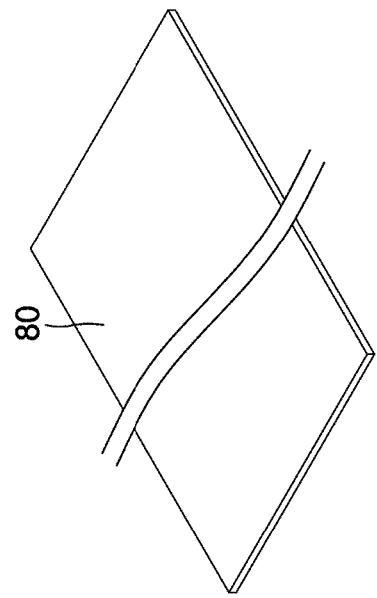
FIG. 2B is a perspective view of the glass tube according to the present invention.
Figure 2D:
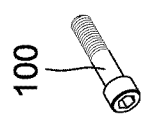
FIG. 2D is a perspective view of the connection component according to the present invention.
Figure 2A:
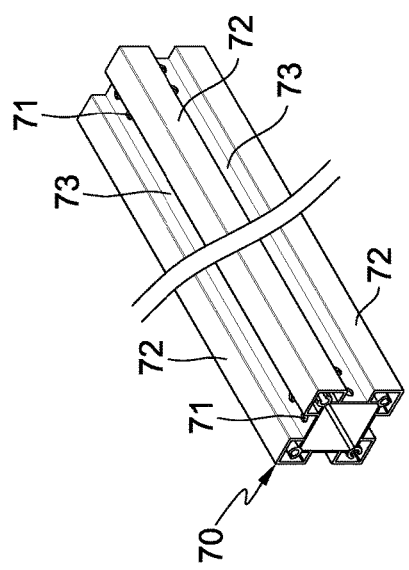
FIG. 2A is a perspective view of the combination connection tube according to the present invention.
Figure 2C:
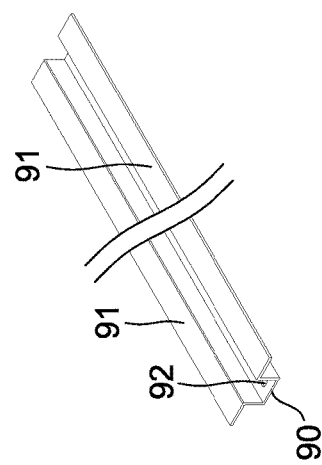
FIG. 2C is a perspective view of the pressing-tugging plate according to the present invention.

The following descriptions are exemplary embodiments only, and are not intended to limit the scope, applicability or configuration of the invention in any way. Rather, the following detailed description provides a convenient illustration for implementing exemplary embodiments of the invention. Various changes to the described embodiments may be made in the function and arrangement of the elements described without departing from the scope of the invention as set forth in the appended claims.

The foregoing and other aspects, features, and utilities of the present invention will be best understood from the following detailed description of the preferred embodiments when read in conjunction with the accompanying drawings.

Regarding the technical means and structures to achieve the object of the present invention, please refer to the embodiments shown in FIGS. 1A, 1B, 1C, 1D, 1E, 1F and 10, which will be explained in detail as follows.

As shown in FIGS. 1A, 1B, 1C, 1D, 1E, 1F, 2A, 2B 2C and 2C, the combination-type glass-greenhouse of the embodiment comprises a plurality of base connectors 10; first connectors 20; second connectors 30; third connectors 40; fourth connectors 50; fifth connectors 60; combination-connection tubes 70; glass plates 80; pressing-tugging plates 90; and connection components 100.

The base connector 10 (please refer to FIGS. 1A, 1B, 1C, 1D, 1E and 1F at the same time) has a fixing bottom-plate 11, and a plurality of positioning lockholes 12 are set in the fixing bottom-plate 11; wherein a plugging connector 13 is protrudedly set from the fixing bottom-plate 11. The plugging connector 13 is provided for the plug-in placement of the combination-connection tube 70; wherein a plurality of lockholes 14 are set on the sidewalls of the plugging connector 13.

The first connector 20 (please refer to FIGS. 1A, 1B, 1C, 1D, 1E and 1F at the same time) has a plugging connector 21 at one end thereof, and the plugging connector 21 is provided for the plug-in placement of the combination-connection tube 70. The sidewalls of the plugging connector 21 are set with a plurality of lockholes 22, and a rear end of the plugging connector 21 is set with a square stopping-blocking plate 23, and each side edge of the square stopping-blocking plate 23 is set with a notch 231. The other end of the square stopping-blocking plate 23 is set with a sleeve-connection seat 24 which is generally semi-cylindrical; wherein a lockhole 25 is radially set on the sleeve-connection seat 24.

The second connector 30 (please refer to FIGS. 1A, 1B, 1C, 1D, 1E and 1F at the same time) has a square stopping-blocking seat 31, and two plugging connectors 32 are set on each side of the square stopping-blocking seat 31 to make the second connectors 30 be substantially L-shaped. The plugging connector 32 is provided for the plug-in placement of the combination-connection tube 70; and the sidewalls of the two plugging connectors 32 are set with a plurality of lockholes 33. A plurality of pad blocks 34 are protrudedly set from the periphery of the square stopping-blocking seat 31, and a concave groove 35 is set in the center of the pad blocks 34.

The third connector 40 (please refer to FIGS. 1A, 1B, 1C, 1D, 1E and 1F at the same time) has a square stopping-blocking seat 41, and three plugging connectors 42 are set on adjacent three sides of the square stopping-blocking seat 41 to make the third connectors 40 be substantially T-shaped. The plugging connector 42 is provided for the plug-in placement of the combination-connection tube 70; and the sidewalls of the three plugging connectors 42 are set with a plurality of lockholes 43. A plurality of pad blocks 44 are protrudedly set from the periphery of the square stopping-blocking seat 41, and a concave groove 45 is set in the center of the pad blocks 44.

The fourth connector 50 (please refer to FIGS. 1A, 1B, 1C, 1D, 1E and 1F at the same time) has a square stopping-blocking seat 51, and four plugging connectors 52 are set on four sides of the square stopping-blocking seat 51 to make the fourth connectors 50 be substantially cross-shaped. The plugging connector 52 is provided for the plug-in placement of the combination-connection tube 70; and the sidewalls of the four plugging connectors 52 are set with a plurality of lockholes 53. A plurality of pad blocks 54 are protrudedly set from the periphery of the square stopping-blocking seat 51, and a concave groove 55 is set in the center of the pad blocks 54.

The fifth connectors 60 (please refer to FIGS. 1A, 1B, 1C, 1D, 1E and 1F at the same time) which one end thereof forms a plugging connector 61 and the plugging connector 61 is provided for the plug-in placement of the combination-connection tube 70; wherein the sidewalls of the plugging connector 61 are set with a plurality of lockholes 62. The rear end of the plugging connector 61 is set with a square stopping-blocking plate 63, and the other end of the square stopping-blocking plate 63 is protrudedly set with a positioning seat 64. The positioning seat 64 is axially set with a positioning lockhole 65. And, each side edge of the square stopping-blocking plate 63 is set with a concave groove opening 631.

The combination-connection tube 70 (please refer to FIGS. 2A, 2B, 2C and 2D at the same time) is a tubular-body which is substantially rectangular-shape and has a plurality of locking-matching holes 71 on the wall. The combination-connection tubes 70 can be plugged-in to connect with the base connectors 10, first connectors 20, second connectors 30, third connectors 40, fourth connectors 50, and the plugging connectors 13, 21, 32, 42, 52 of the fifth connectors 50. The periphery of the combination-connection tubes 70 is set with a plurality of pad blocks 72, and a concave groove 73 is set between the two pad blocks 72.

The glass plates 80 (please refer to FIGS. 2A, 2B, 2C and 2D at the same time) are placed on the pad blocks 72 of the combination-connection tubes 70 and on the first connectors 20, second connectors 30, third connectors 40, the fourth connectors 50, and the fifth connectors 60.

The pressing-tugging plate 90 (please refer to FIGS. 2A, 2B, 2C and 2D at the same time) is a plate-body which is substantially U-shape, and is set with wing-portion 91 on both sides thereof. The pressing-tugging plates 90 are set with a plurality of locking-matching holes 92. The pressing-tugging plates 90 can be placed on the concave grooves 73 of the combination-connection tubes 70 and in the notches 231 and 631 of the first connectors 20 and fifth connectors 60, and placed in the concave grooves 35, 45, 55 of the second connectors 30, third connectors 40, and fourth connectors 50. The wing-portion 91 of the pressing-tugging plates 90 is pressed and tugged on the glass plates 80. And, the locking-matching hole 92 of the pressing-tugging plates 90 is coupled with a screw screw-lock element 93 and the screw-lock element 93 can be locked to the locking-matching hole 71 of the combination-connection tubes 70.

The connection components 100 (please refer to FIGS. 2A, 2B, 2C and 2D at the same time) can be inserted and set into the lockholes 25 of the first connectors 20 and the positioning lockholes 65 of the fifth connectors 60; and can be passed through and set the locking-matching holes 71, 92 of the combination-connection tubes 70 and the pressing-tugging plates 90 to lock to the lockholes 14, 22, 33, 43, 53, 65 of the base connectors 10, first connectors 20, second connectors 30, third connectors 40, fourth connectors 50, and fifth connectors 60 through the combination-connection tubes 70 and the pressing-tugging plates 90.

Figure 3:
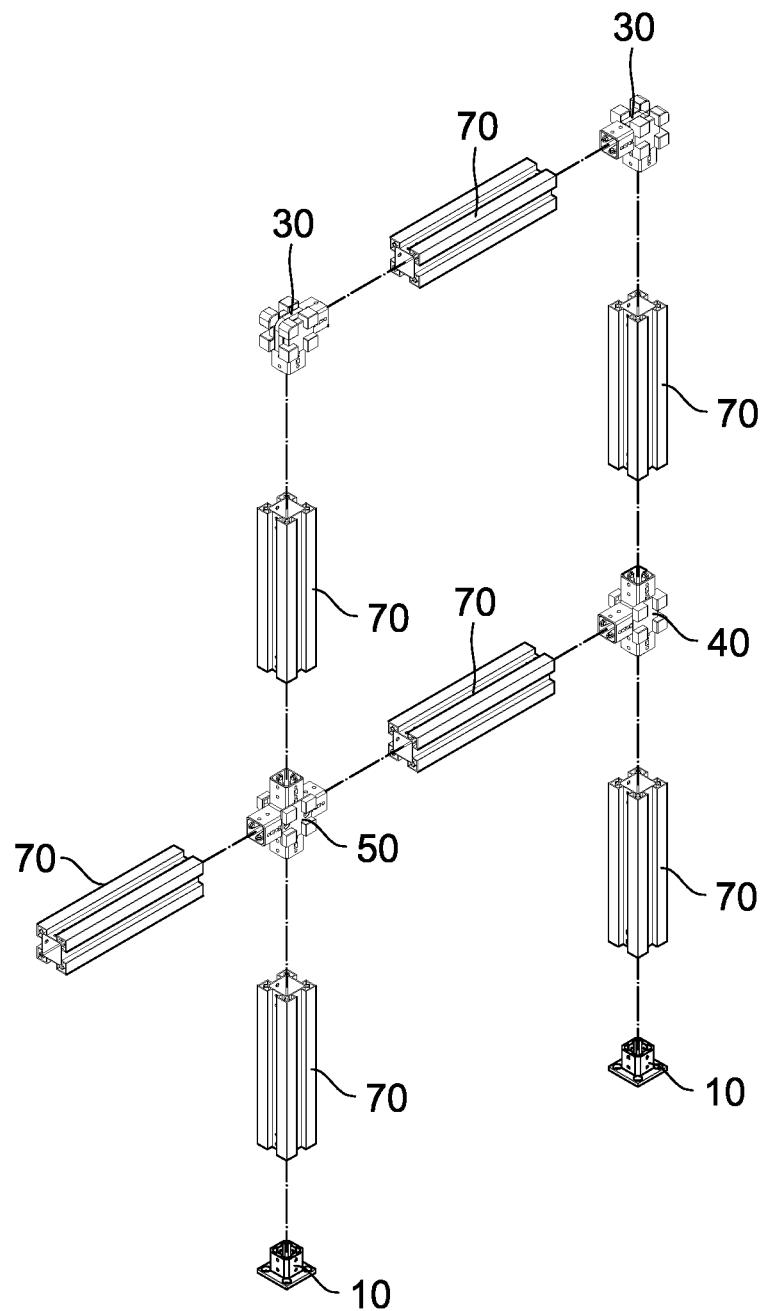
FIG. 3 is a stereoscopic decomposition schematic diagram for combining and connecting to form a lattice-type frame-body according to the present invention.

With the above configuration, as shown in FIG. 3, a plurality of combination-connection tubes 70 can be respectively inserted and set on the plugging connectors 32, 42, 52 of the second connectors 30, third connectors 40, and fourth connectors 50; so that the combination-connection tubes 70 can be formed into the patterns with horizontal-type and vertical-type; thereby forming a lattice-type frame-body A. Then, the connection components 100 can be used to inserted and placed into the locking-matching holes 71 of the combination-connection tubes 70 to lock and fix with the lockholes 33, 43, 53 of the second connectors 30, third connectors 40, and fourth connectors 50; thereby the combination-connection tubes 70 can be combined and fixed with the second connectors 30, third connectors 40, and fourth connectors 50. The combination-connection tubes 70 can be positioned and fixed, and can be further assembled into a solid lattice-type frame-body A (as shown in FIG. 4).

Figure 4:
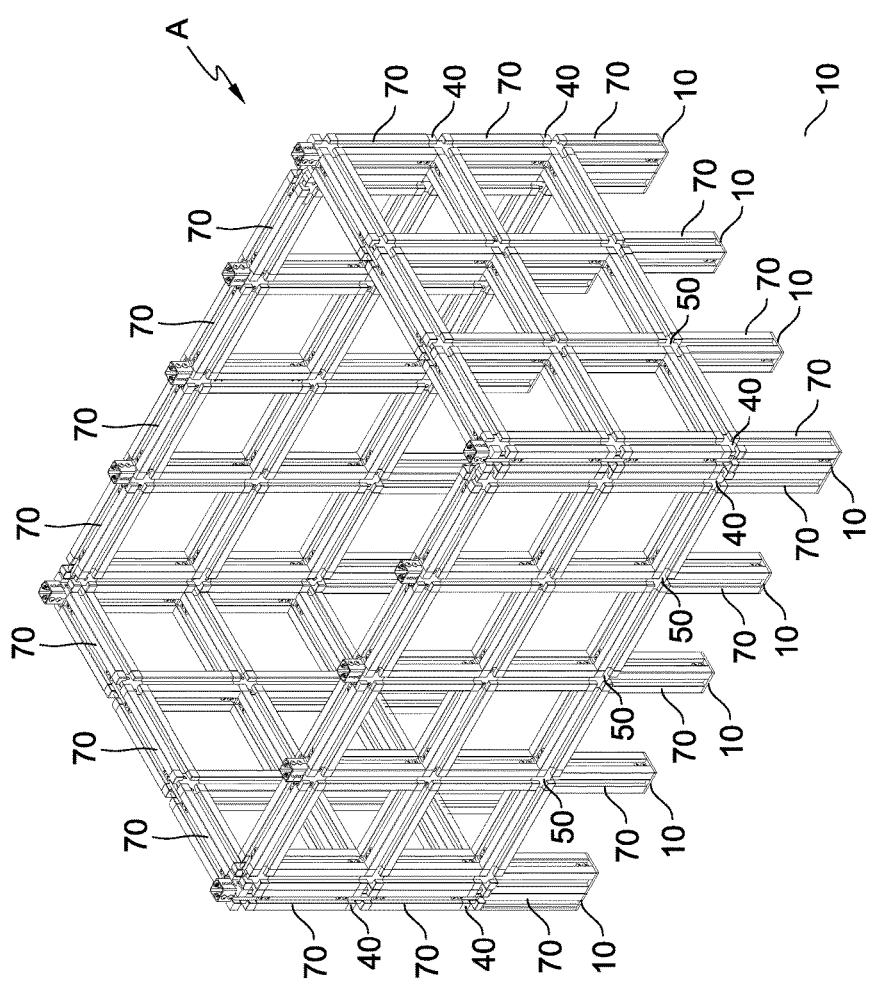
FIG. 4 is a schematic diagram for combining and connecting to form a lattice-type frame-body according to the present invention.

As shown in FIG. 4, the above-mentioned combined lattice-type frame-body A can be directly placed on the ground, or a plurality of combination-connection tubes 70 can be further disposed under the lattice-type frame-body A to make the lowermost combination-connection tubes 70 present upright; such that the upright combination-connection tubes 70 can be inserted and placed into the plugging connectors 13 of the base connectors 10. Then, the connection components 100 are inserted and placed into the locking-matching holes 71 of the combination-connection tubes 70 to screw-locked to the lockholes 14 of the base connectors 10; and the base connectors 10 can be locked to the building base or the ground by using the connection components to pass through and place into the positioning lockholes 12. Therefore, the lattice-type frame-body A can be fixed on the building base or the ground without being affected by external force (such as a strong wind).

Figure 5:
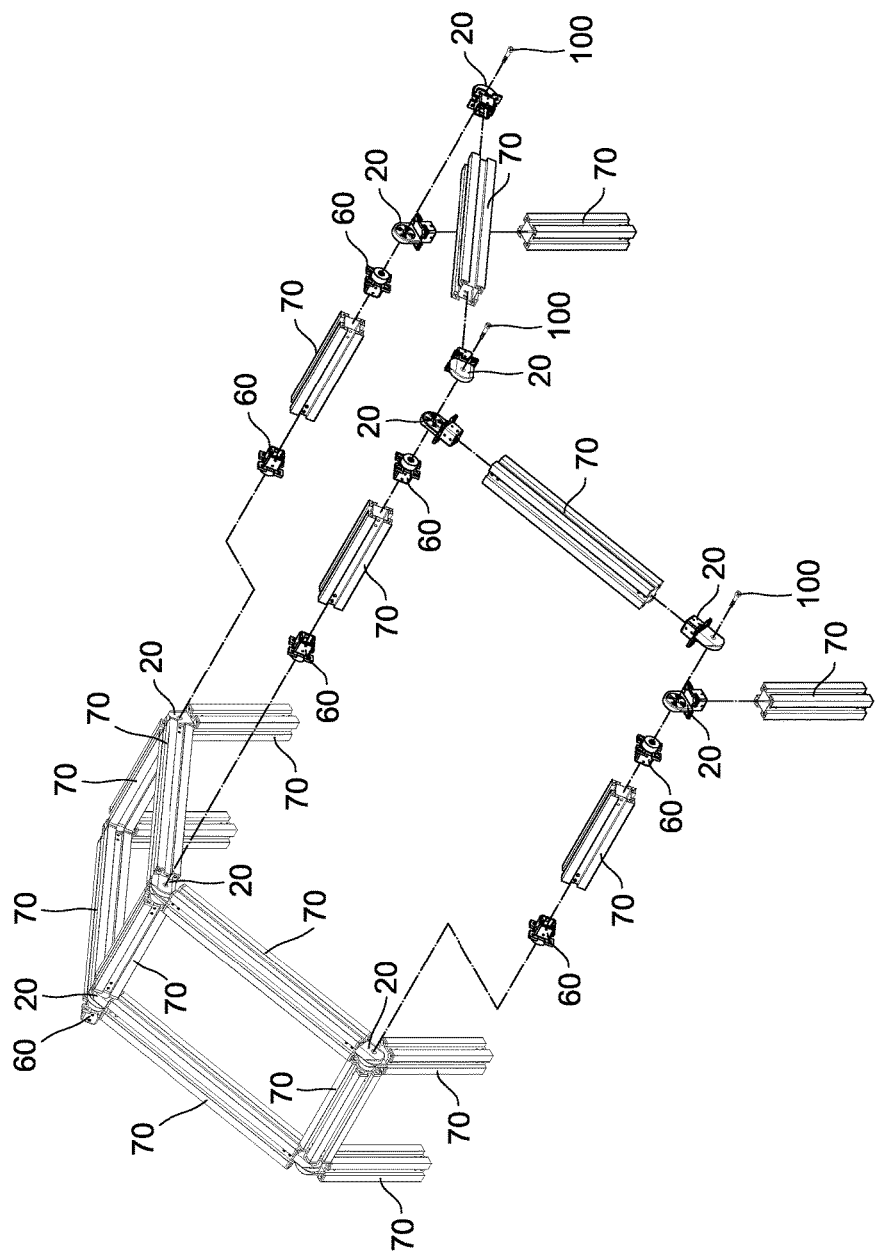
FIG. 5 is a decomposition schematic diagram for combining, connecting to form a lattice-type roof according to the present invention.
Figure 6:
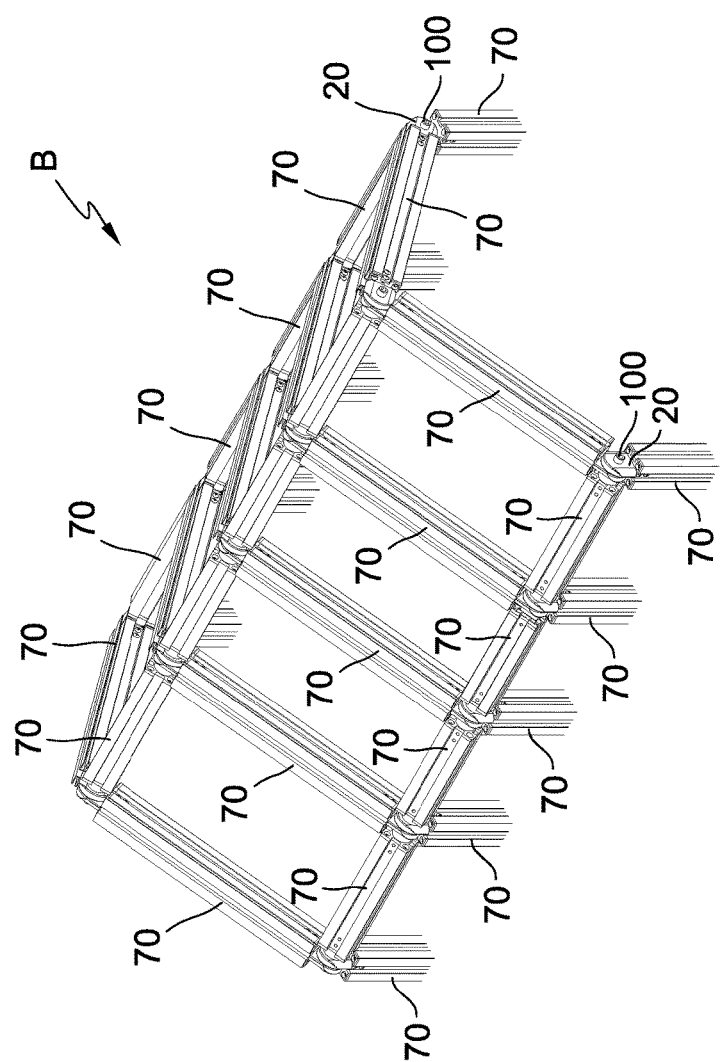
FIG. 6 is a schematic diagram for combining and connecting to form a lattice-type roof according to the present invention.
Figure 7:
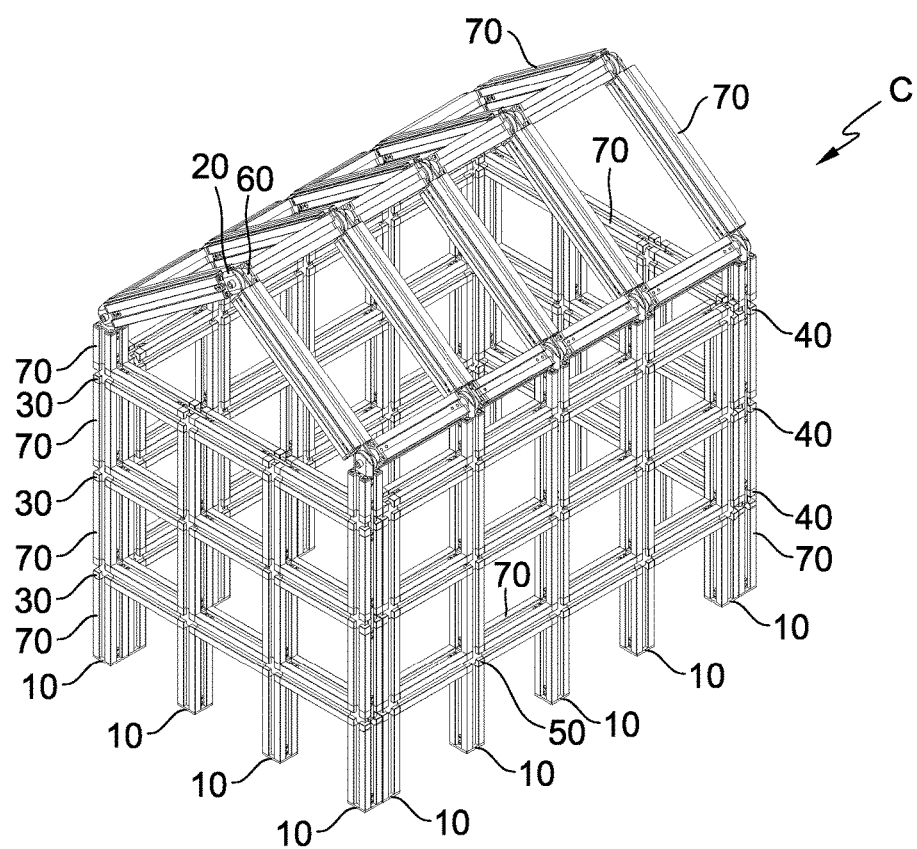
FIG. 7 is a schematic diagram for combining and connecting a lattice-type frame-body and a lattice-type roof to form a greenhouse skeleton according to the present invention.

As shown in FIG. 5, the two sleeve-connection seats 24 of the first connectors 20 and the positioning seat 64 of the fifth connectors 60 can be abutted, so that the two lockholes 25 set by the first connectors 20 are connected in series with the positioning lockholes 65 of the fifth connectors 60. Then, the connection components 100 can be used to inserted and placed into the two lockholes 25 of the first connectors 20 to lock and fix with the positioning lockholes 65 of the fifth connectors 60 to make the two first connectors 20 combine and connect with the fifth connectors 60; and the combination-connection tubes 70 can be inserted and placed into the plugging connector 21 of the first connectors 20 and the plugging connector 61 of the fifth connectors 60; thereby, as shown in FIG. 5, a plurality of first connectors 20, fifth connectors 60, and combination-connection tubes 70 can be combined to form a lattice-type roof B (as shown in FIG. 6). Then, the lattice-type roof B can be assembled and set on the lattice-type frame-body A by using a plurality of first connectors 20 and combination-connection tubes 70 to form a greenhouse skeleton C (as shown in FIG. 7).

Continuing the above description, in a preferred embodiment, the lattice-type roof B is preferably in the shape of a pointed-mountain.

Figure 8:
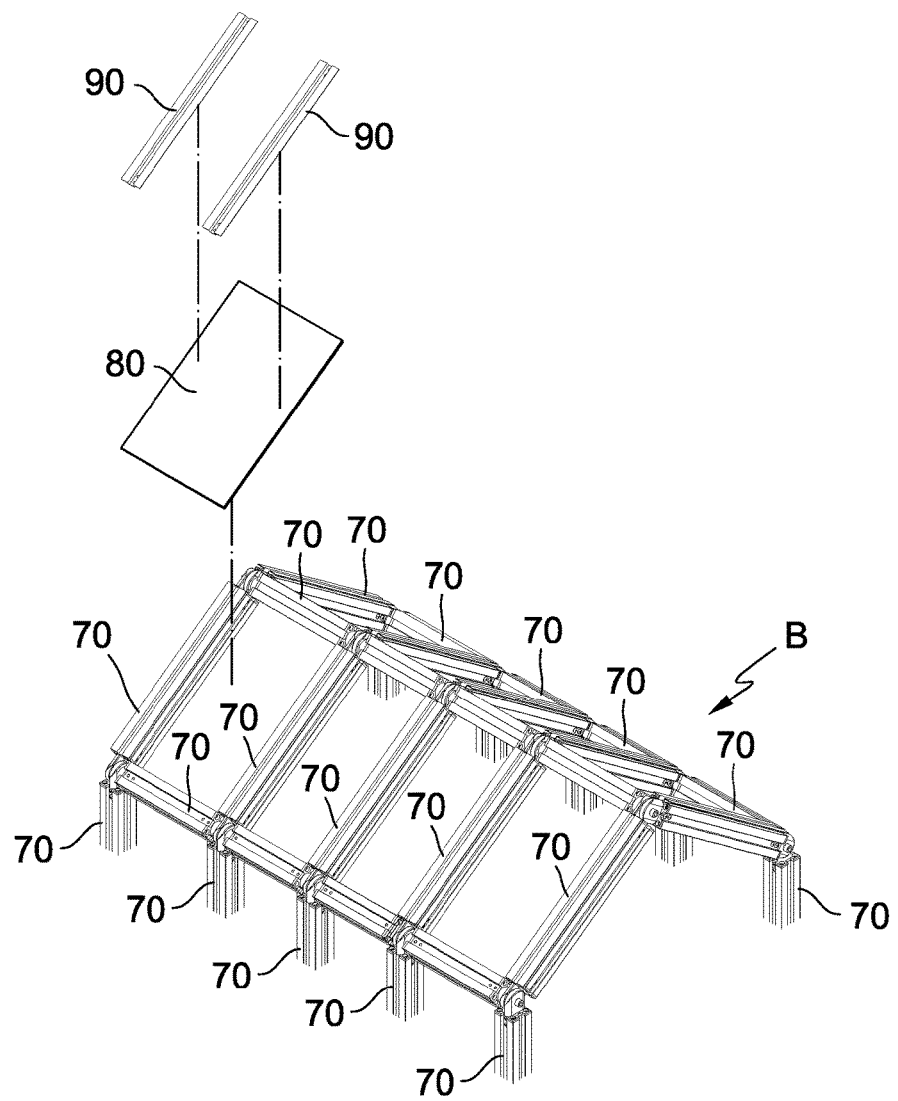
FIG. 8 is a decomposition schematic diagram for combining and setting the glass plates and the pressing-tugging plates on the lattice-type roof according to the present invention.
Figure 10:
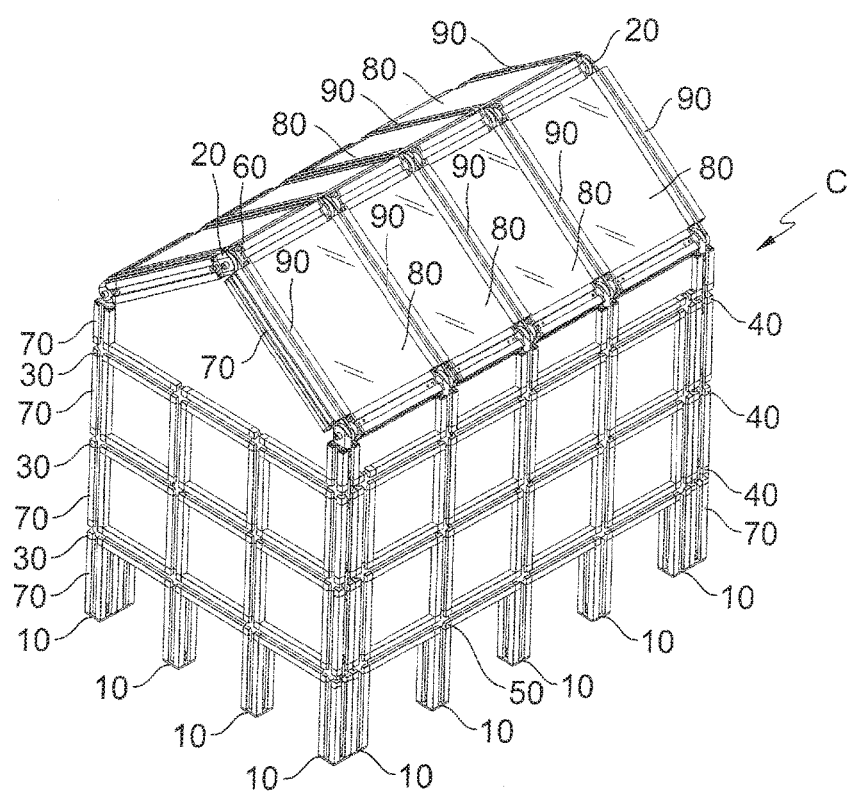
FIG. 10 is a schematic diagram for combining and setting to form a glass-greenhouse according to the present invention.

And, as shown in FIG. 8, the glass plates 80 can be placed across the two combination-connection tubes 70 of the lattice-type roof B; then the pressing-tugging plates 90 are used to receive and set the glass plates 80 on the concave groove 73 of the combination-connection tubes 70 and in the notch 231, 631 of the first connectors 20 and the fifth connectors 60, and in the concave grooves 35, 45, 55 of the second connectors 30, the third connectors 40, and the fourth connectors 50; and the wing-portion 91 of the pressing-tugging plates 90 is pressed and tugged on the glass plates 80 to position the glass plates 80; then the screw-lock element 93 is inserted through and placed into the locking-matching hole 92 of the pressing-tugging plates 90 to lock and set in the lockholes 71 of the combination-connection tubes 70. The pressing-tugging plates 90 can press, tug, and position the glass plates 80 (as shown in FIGS. 9A and 9B) and the glass plates 80 will not fall off the combination-connection tubes 70, so as to be able to assemble and set to form a glass-greenhouse (as shown in FIG. 10).

Therefore, the present invention does have the following advantages:

(1) Since the present invention utilizes a plurality of base connectors 10, first connectors 20, second connectors 30, third connectors 40, fourth connectors 50, fifth connectors 60, combination-connection tubes 70, glass plates 80, pressing-tugging plates 90, and connection components 100 to assemble, set, and form; which has the advantages of simple structure and simple and quick assembly.

(2) Since the present invention presses and togs a plurality of glass plates 80 to fix glass plates 80 on the lattice-type frame-body A and the lattice-type roof B by using the pressing-tugging plates 90, the glass plates 80 can be stably supported and set on the lattice-type frame-body A and the lattice-type roof B to form a glass-greenhouse; such that it can block the glass-greenhouse from the influences of external weather condition and temperature.

(3) Since the lattice-type frame-body A and the lattice-type roof B of the present invention are composed of a plurality of base connectors 10, first connectors 20, second connectors 30, third connectors 40, fourth connectors 50, fifth connectors 60, and combination-connection tubes 70 to assemble and form a lattice-type frame-body. Therefore, the glass-greenhouse is in a grid-form which can provide effective light irradiation into the glass-greenhouse, so that the glass-greenhouse of the present invention can heat and warm the plants, soil and air therein to achieve the effect of the greenhouse.

(4) Since the present invention is a combination-type glass-greenhouse, the greenhouse can be set according to the required range, planting area, and height; and when the glass-greenhouse needs to be expanded or reduced, it can also be directly disassembled and removed. If wanting to reduce the greenhouse, or add a connecting greenhouse, it does not need to disassemble and remove all; so it can reduce the waste of building materials, and have a certain degree of convenience and practicality.

(5) Since the present invention utilizes a plurality of base connectors 10, first connectors 20, second connectors 30, third connectors 40, fourth connectors 50, fifth connectors 60, combination-connection tubes 70, glass plates 80, pressing-tugging plates 90, and connection components 100 to assemble, set, and form; therefore, when it is no longer used, it can be disassembled one by one and can be placed and stored, and can be used again when the glass-greenhouse is to be set up next time, so the present invention has environmentally-friendly reuse.

(6) Since the present invention utilizes a plurality of base connectors 10, first connectors 20, second connectors 30, third connectors 40, fourth connectors 50, fifth connectors 60, combination-connection tubes 70, glass plates 80, pressing-tugging plates 90, and connection components 100 to assemble, set, and form; therefore it can be produced and stored in large quantities, which can reduce production costs.

I claim:

1. A combination-type glass-greenhouse, comprising a plurality of base connectors, a plurality of first connectors, a plurality of second connectors, a plurality of third connectors, a plurality of fourth connectors, a plurality of fifth connectors, a plurality of combination-connection tubes, a plurality of glass plates, a plurality of pressing-tugging plates, and a plurality of connection components;

wherein each of the plurality of base connectors has a fixing bottom-plate, and a plurality of base positioning lockholes are set in the fixing bottom-plate;

wherein a base plugging connector is protrudedly set from the fixing bottom-plate;

wherein the base plugging connector is provided for a plug-in placement of one of the plurality of combination-connection tubes wherein a plurality of base lockholes are set on sidewalls of the base plugging connector;

wherein each of the plurality of first connectors has a first plugging connector at one end thereof, and the first plugging connector is provided for a plug-in placement of one of the plurality of combination-connection tubes; wherein sidewalls of the first plugging connector are set with a plurality of first lockholes, and a rear end of the first plugging connector is set with a first square stopping-blocking plate having a plurality of side edges, and each of the side edges of the first square stopping-blocking plate is set with a notch;

wherein an end of the first square stopping-blocking plate is set with a sleeve-connection seat which is generally semi-cylindrical;

wherein a seat lockhole is radially set on the sleeve-connection seat;

wherein each of the plurality of second connectors, has a second square stopping-blocking seat having two sides, and two second plugging connectors are set on each of the two sides of the second square stopping-blocking seat to make the plurality of second connectors be substantially L-shaped;

wherein each of the second plugging connectors is provided for a plug-in placement of one of the plurality of combination-connection tubes and sidewalls of the two second plugging connectors are set with a plurality of second lockholes;

wherein a plurality of second pad blocks are protrudedly set from a periphery of the second square stopping-blocking seat, and a concave groove is set in a center of the plurality of second pad blocks;

wherein each of the third connectors has a third square stopping-blocking seat, and three third plugging connectors are set on three adjacent sides of the third square stopping-blocking seat to make the plurality of third connectors be substantially T-shaped;

wherein a third plugging connector is provided for a plug-in placement of one of the combination-connection tubes; and sidewalls of the three third plugging connectors are set with a plurality of third lockholes;

wherein a plurality of third pad blocks are protrudedly set from a periphery of the third square stopping-blocking seat, and a concave groove is set in a center of the plurality of third pad blocks;

wherein each of the fourth connectors has a fourth square stopping-blocking seat, and four fourth plugging connectors are set on four sides of the fourth square stopping-blocking seat to make the plurality of fourth connectors be substantially cross-shaped;

wherein a fourth plugging connector is provided for a plug-in placement of one of the plurality of combination-connection tubes; and sidewalls of the four fourth plugging connectors are set with a plurality of fourth lockholes;

wherein a plurality of fourth pad blocks are protrudedly set from a periphery of the fourth square stopping-blocking seat, and a concave groove is set in a center of the fourth pad blocks;

wherein each of the fifth connectors has one end thereof that forms a fifth plugging connector and the fifth plugging connector is provided for a plug-in placement of one of the plurality of combination-connection tubes;

wherein sidewalls of the fifth plugging connector are set with a plurality of fifth lockholes;

wherein a rear end of the fifth plugging connector is set with a fifth square stopping-blocking plate having a plurality of side edges, and another end of the fifth square stopping-blocking plate is protrudedly set with a positioning seat;

wherein the positioning seat is axially set with a fifth positioning lockhole and each of the plurality of side edge of the fifth square stopping-blocking plate is set with a concave groove opening;

wherein each of the plurality of combination-connection tubes is a tubular-body which is a substantially rectangular-shape and has a wall having a plurality of locking-matching holes;

wherein each of the combination-connection tubes can be plugged-in to connect with at least one of the plurality of base connectors, at least one of the plurality of first connectors, at least one of the plurality of second connectors, at least one of the plurality of third connectors, at least one of the plurality of fourth connectors, and the plugging connectors of at least one of the plurality of fifth connectors;

wherein a periphery of each of the combination-connection tubes is set with a plurality of combination-connection pad blocks, and a concave groove is set between the plurality of combination-connection pad blocks;

wherein the plurality of glass plates are placed on the plurality of combination-connection pad blocks and on the plurality of first connectors, the plurality of second connectors, the plurality of third connectors, the plurality of fourth connectors, and the plurality of fifth connectors;

wherein each of the plurality of pressing-tugging plates is a plate-body having two sides, and is substantially U-shaped, and is set with a wing-portion on each of the two sides;

wherein each of the plurality of pressing-tugging plates is set with a plurality of locking-matching holes;

wherein the plurality of pressing-tugging plates can be placed on the concave grooves of the plurality of combination-connection tubes and in the notches of the plurality of first connectors and the plurality of fifth connectors, and placed in the concave grooves of the plurality of second connectors, the plurality of third connectors, and the plurality of fourth connectors;

wherein each of the wing-portions of the plurality of pressing-tugging plates is pressed and tugged on the plurality of glass plates; and wherein the plurality of connection components can be inserted and set into the locking-matching holes of the plurality of combination-connection tubes and the locking-matching holes of the plurality of pressing-tugging plates, and locked to the lockholes of the plurality of base connectors, the plurality of first connectors, the plurality of second connectors, the plurality of third connectors, the plurality of fourth connectors, and the plurality of fifth connectors to position and fix the plurality of combination-connection tubes and the plurality of pressing-tugging plates.

* * * * *